United States Patent Office 3,557,020
Patented Jan. 19, 1971

3,557,020
HCl OR HBr VAPOR CARBONIZATION OF VEGETABLE MATERIAL IN THE MANUFACTURE OF ACTIVATED CARBON
Akio Shindo, Isao Souma, and Yoichiro Nakanishi, Osaka, Japan, assignors to Agency of Industrial Science and Technology, Tokyo, Japan, a corporation of Japan
No Drawing. Filed Jan. 11, 1968, Ser. No. 697,008
Claims priority, application Japan, Jan. 13, 1967, 42/2,490
Int. Cl. C01b 31/08
U.S. Cl. 252—422
3 Claims

ABSTRACT OF THE DISCLOSURE

Wood or other vegetable material having a non-uniform shape such as shapeless particle powder, flaky powder, chip and the others is carbonized in an acidic atmosphere containing vapor or gas of hydrochloric or hydrobromic acid or its anhydride for 10 minutes to 10 hours at a temperature of 80–1200° C. to obtain activated carbon of superior adsorption activity in very high yields.

If desired, the activated carbon so obtained is heated further in an atmosphere containing an oxidizing gas such as steam, carbon dioxide gas or air, or in an inert atmosphere to improve the adsorption activity of said carbon.

BACKGROUND OF THE INVENTION

This invention relates to a method for the manufacture of activated carbon utilizing gas or vapor of acid.

As conventional methods for the manufacture of activated carbon utilizing acid, a method which comprises adding an aqueous sulfuric or phosphoric acid solution to raw material and carbonizing it, a method which comprises boiling wood charcoal in a fuming nitric acid solution, drying the solution and carbonizing the resulting dry solid, and a method which comprises dissolving sucrose in an aqueous concentrated solution of hydrochloric acid at a temperature below 100° C., drying the solution into solid form and carbonizing the solid, are known.

Also, a method for the manufacture of activated carbon of superior adsorption activity in high yields which comprises dipping raw material in an aqueous concentrated solution of zinc chloride, drying the material and thereafter carbonizing it is known, but, in this method, because zinc chloride is expensive, it is necessary, after producing activated carbon, to wash it with water to recover the zinc chloride.

An object of this invention is to provide a method of producing activated carbon of superior adsorption activity easily and in high yields.

Another object of this invention is to provide a method of improving the adsorption activity of activated carbon.

Other objects and advantages of this invention will become apparent from the detailed explanation given hereunder.

DETAILED EXPLANATION OF THE INVENTION

This invention relates to a method of producing activated carbon of superior adsorption activity by carbonizing a vegetable material having non-uniform shape such as, for example, shapeless particle powder, flaky powder and chip in an acidic atmosphere containing vapor or gas of hydrochloric or hydrobromic acid or acid anhydride, and to a method of improving the adsorption activity of such activated carbon by subjecting it further to an activation treatment in an atmosphere containing an oxidizing gas such as carbon dioxide gas, steam or air or in an inert atmosphere.

In the present invention, an "acidic atmosphere" means an atmosphere containing vapor or gas of acid or acid anhydride, including acid only and anhydride only.

Materials which are utilized as the starting materials in the method of this invention include cellulose, starch, sucrose, molasses and lignin, or materials containing these, for example, cereals, wood, shells straw, chaff, strained lees of white potato, sweet potato or beet molasses, and the cob and stalk of corn. As the cellulose, use may be made of pulp, nitrocellulose, or microcrystalline cellulose. Also, granular materials produced from the above-mentioned materials with molasses, alcohol, sucrose, etc. as caking agents can be used. It does not matter whether a melting material or non-melting material is selected as the raw material.

The atmosphere used in this invention is a non-oxidizing acidic atmosphere containing vapor or gas of hydrochloric or hydrobromic acid. In practice, an atmosphere containing hydrochloric acid gas is most preferable.

The temperature at which the raw material is carbonized in an acidic atmosphere is 80–1200° C., desirably 200–1000° C., most preferably 300–900° C. The temperature may be elevated either continuously or stagewise.

The time of carbonizing in an acidic atmosphere is, in practice, 10 minutes to 10 hours, but, in some cases, it may be made longer. For example, when an inert atmosphere containing less than 5% by volume of vapor of acid is used, the carbonizing time must be made long.

The carbonization treatment may be effectively carried out by circulating or refluxing the acidic atmosphere in a furnace, or by continuously feeding in a fresh acidic atmosphere, during the carbonizing of raw material.

As stated above, in this invention, it is possible, by carbonizing raw material in a non-oxidizing acidic atmosphere, to produce activated carbon of superior adsorption activity in high yields. For example, by carbonizing cellulose, starch, sucrose and lignin each in a hydrochloric acid atmosphere at 800° C., it was possible to obtain activated carbons in the respective yields 30%, 40%, 55% and 25% higher than in the case where each of said materials was carbonized under the same conditions but in an inert atmosphere.

However, it was found that, if the activated carbon obtained by carbonizing in an acidic atmosphere is further subjected to an activation treatment in an atmosphere containing an oxidizing gas such as steam, carbon dioxide gas or air, the adsorption activity of said carbon would be improved.

In a steam-containing atmosphere, the above-mentioned activation treatment is carried out for 30 minutes to 10 hours at 600–1000° C., but, in an atmosphere containing carbon dioxide gas, a temperature of 700–900° C. is effective, and, in an air-containing atmosphere, a temperature of 500–800° C. is effective. This activation treatment, at a temperature of 500–1000° C., may be carried out continuously by replacing the acidic atmosphere with an oxidizing gas-containing atmosphere while carbonizing raw material in said acidic atmosphere.

It was further confirmed that, when the activated carbon obtained by carbonizing in an acidic atmosphere at a temperature within the range of 200–600° C. was heated further in an inert atmosphere at a temperature higher than said temperature but below 1200° C., the adsorption activity of said carbon was improved.

DESCRIPTION OF PREFERRED EMBODIMENTS

Specific examples of this invention are given hereunder, but this invention is not limited to these examples.

EXAMPLE 1

Lauan saw-dust was carbonized in a hydrochloric acid gas atmosphere under one atmospheric pressure at a temperature elevation rate of 120° C. per hour from 100° C. to 250° C. The material was reduced in weight by about 30%, and activated carbon of superior adsorption activity was obtained.

EXAMPLE 2

In a nitrogen atmosphere containing 20% by volume of hydrochloric acid gas, a particle powder sucrose was carbonized for 2 hours by continuously elevating the temperature from 80° C. to 500° C. Activated carbon of superior adsorption activity was obtained in a yield of about 60%.

EXAMPLE 3

Wood meal was carbonized in a hydrochloric acid gas atmosphere by elevating the temperature from 100° C. to 700° C. After carbonizing for 20 minutes at 700° C., the hydrochloric acid gas was expelled by nitrogen gas, then steam was fed in, and the material was heated for 30 minutes at 800° C. to obtain activated carbon of superior adsorption activity.

EXAMPLE 4

In a nitrogen gas atmosphere containing 60% by volume of hydrochloric acid gas, strained lees of sweet potato were carbonized by continuously elevating the temperature from 100° C. to 400° C. in one hour and from 400° C. to 750° C. in one hour. Thereafter, at 750° C., while feeding in carbonic acid gas, the material was heated for 40 minutes to obtain activated carbon of superior adsorption activity.

What is claimed is:
1. A method for the manufacture of activated carbon, which comprises carbonizing a vegetable material having a non-uniform shape in hydrochloric or hydrobromic acid vapor only for 10 minutes to 10 hours at 80–1200° C.
2. A method for the manufacture of activated carbon, which comprises carbonizing a vegetable material having a non-uniform shape in hydrochloric or hydrobromic acid vapor only for 10 minutes to 10 hours at 80–1200° C., and thereafter heating the material in an oxidizing gas-containing atmosphere for 30 minutes to 10 hours at 500–1000° C.
3. A method for the manufacture of activated carbon, which comprises carbonizing a vegetable material having a non-uniform shape in hydrochloric or hydrobromic acid vapor only at a temperature of 200–600° C., and thereafter heating the material in an inert atmosphere at a temperature higher than said first-named temperature but below 1200° C.

References Cited

UNITED STATES PATENTS

| 1,891,407 | 12/1932 | Godel | 252—421 |
| 2,036,380 | 4/1936 | Wortz | 252—422 |
| 2,977,325 | 3/1961 | Feustel et al. | 252—445 |
| 3,186,923 | 6/1965 | Lyness | 201—36 |

FOREIGN PATENTS

| 251,636 | 7/1927 | Great Britain | 252—422 |
| 309,855 | 10/1929 | Great Britain | 252—422 |
| 411,918 | 6/1934 | Great Britain | 252—445 |
| 1,181,682 | 11/1964 | Germany | 252—445 |

DANIEL E. WYMAN, Primary Examiner

P. E. KONOPKA, Assistant Examiner

U.S. Cl. X.R.

201—25, 36; 252—421, 445